(12) United States Patent
Erden et al.

(10) Patent No.: US 9,570,104 B1
(45) Date of Patent: Feb. 14, 2017

(54) READ HEAD WITH CO-PLANAR READERS OFFSET FROM A THIRD READER

(71) Applicant: Seagate Technology LLC, Cupertino, CA (US)

(72) Inventors: Mehmet Fatih Erden, St. Louis Park, MN (US); Edward Charles Gage, Lakeville, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/067,399

(22) Filed: Mar. 11, 2016

(51) Int. Cl.
*G11B 5/02* (2006.01)
*G11B 20/10* (2006.01)
*G11B 5/48* (2006.01)

(52) U.S. Cl.
CPC ....... *G11B 20/10009* (2013.01); *G11B 5/4826* (2013.01)

(58) Field of Classification Search
CPC ..... G11B 2220/90; G11B 15/087; G11B 5/00; G11B 5/02; G11B 15/125; G11B 15/02; G11B 15/14; G11B 5/0086; G11B 15/52; G11B 15/1875; G11B 5/59627
USPC ............ 360/18, 24, 62, 64, 77.06, 73.12, 26
See application file for complete search history.

(56) References Cited

U.S. PATENT DOCUMENTS

| | | | |
|---|---|---|---|
| 8,988,812 B1 | 3/2015 | Brunnett et al. | |
| 9,443,551 B1 * | 9/2016 | Varnica | G11B 20/12 |
| 2013/0286502 A1 | 10/2013 | Erden et al. | |

* cited by examiner

*Primary Examiner* — Nabil Hindi
(74) *Attorney, Agent, or Firm* — Hollingsworth Davis, LLC

(57) ABSTRACT

A combination user data signal is read from two or more inner tracks of a recording medium via a first reader that encompasses the inner tracks. First and second data signals are read from respective first and second outer tracks that surround the inner tracks via second and third co-planar readers that are on a same head-gimbal assembly as the first reader. The first reader is centered between and downtrack from the first and second co-planar readers on the read head. User data is recovered based on the combination user data signal and the first and second data signals.

20 Claims, 6 Drawing Sheets

READ HEAD WITH CO-PLANAR READERS OFFSET FROM A THIRD READER

SUMMARY

Various embodiments described herein are generally directed to a read head with co-planar readers offset from a third reader. In one embodiment, a combination user data signal is read from two or more inner tracks of a recording medium via a first reader that encompasses the inner tracks. First and second data signals are read from respective first and second outer tracks that surround the inner tracks via second and third co-planar readers that are on a same read head as the first reader. The first reader is centered between and downtrack from the first and second co-planar readers on the read head. User data is recovered based on the combination user data signal and the first and second data signals.

In another embodiment, a head-gimbal assembly includes first, second, and third readers. The first reader is located between the second and third readers in a crosstrack direction. The second and third readers are co-planar and offset from the first reader in a downtrack direction. A controller is coupled to the head-gimbal assembly and configured to receive a combination user data signal from the first reader. The combination user data signal is read from two or more inner tracks of a recording medium encompassed by the first reader. The controller is configured to receive first and second data signals from the second and third readers. The first and second data signals are read from respective first and second outer tracks that surround the inner tracks. The controller is also configured to recover user data based on the combination user data signal and the first and second data signal.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
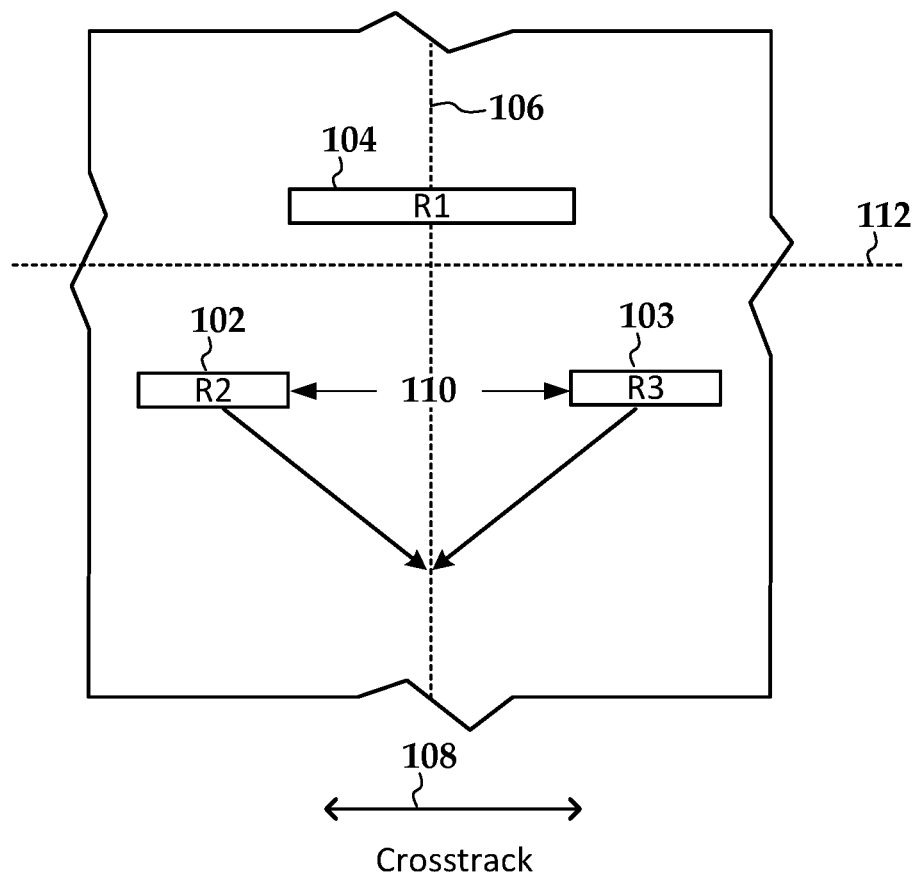
FIG. 1 is a block diagram of read/write head transducers according to an example embodiment.

The present disclosure generally relates to magnetic data storage device such as hard disk drives (HDDs). With today's perpendicular magnetic recording (PMR) technology, conventional HDD architectures are close to the superparamagnetic limit, which restricts the minimum bit size on magnetic recording media. New technologies based on heat-assisted magnetic recording (HAMR) and bit-patterned media (BPM) can record data at target higher areal density (AD) than PMR assuming conventional one-dimensional (1-D) system designs and drive architectures. In contrast, the magnetic media surface, in principle, provides a two-dimensional (2-D) recording environment.

The system design and the resulting drive architecture of conventional HDDs constrain an inherently 2-D system to a 1-D system due, e.g., to cost and complexity considerations. In parallel with HAMR and BPM, the overall 1-D design constraints are being further explored to see if the current and future recording technologies such as PMR, HAMR, and BPM can support higher AD and/or better drive performance. For example, some of those constraints can be modified to make the system utilize the 2-D nature of the media surface. This technology includes what is known as two-dimensional magnetic recording (TDMR).

A TDMR drive includes multiple read transducers built onto the same head-gimbal assembly (HGA). The read transducers may be integrated into a single read head, or may be part of separate read heads (e.g., sliders) commonly mounted on a single HGA. For purposes of this disclosure, the terms "read transducer," "read sensor," "reader," and "magnetoresistive stack" may be used interchangeably. The readers in a TDMR drive may cover different regions of the media, and the signals from the readers can be read separately or combined. For example, adjacent-track interference may be reduced by reading signals from a target track and at least part of an adjacent track and removing components of the adjacent track signal from the target track signal. In other cases, a TDMR device may be configured to simultaneously decode two or more tracks in parallel.

Two-dimensional magnetic recording architectures can be classified as binary recoding or multi-level recording. Binary recording uses signals that vary between two levels, and multi-level recording uses signals that can have more than two levels. Binary recording may be configured as Single Track of Interest (1 TOI), which is also known as Multi-Sensor Magnetic Recording (MSMR) or TDMR Single-Track (TDMR-ST). For TDMR-ST, all of the multiple readers are placed over the same track of interest, e.g., to increase areal density (AD). Binary recording also includes Multiple Tracks of Interest (>1 TOI) architectures, also known as TDMR Multi-Track (TDMR-MT) recording. For this type of architecture, all the readers are placed over more than one adjacent track. This can both increase sequential read performance and increase AD. Multi-level recording, also known as TDMR-ML, places a reader over integer multiples of tracks for increased sequential read performance. The signal read from two or more tracks can be a combination of binary signals, and so can have more than two signal levels.

The benefits of MSMR and TDMR-MT architectures increase with an increase in the number of readers. One way of increasing the number of readers is to build each reader on different layers. In this case, the term "different layers" refers to all layers that encompass the read transducer (e.g., shields, magnetoresistive layers) being non-coplanar (different layers). Building the readers on different layers increases the wafer cost, because it adds to the number of manufacturing steps. For example, if N steps are required to build a reader and there are M readers, the number of steps to build all of the readers is roughly N×M. Another way to increase the number of readers is to build them at the same layer. This is more cost-effective because multiple readers can be formed during each reader-building processing step, e.g., M readers can be formed using slightly more than N steps described above. However, with current fabrication technology, the manufacturable edge-to-edge distance of co-planar readers is much larger than the practical track widths. Thus, co-planar readers will not be able to address adjacent tracks in cases where track pitch is small.

Increasing number of readers may also require more pads for extra readers, or some other means of connecting multiple readers to channel circuitry. This can add cost and complexity to the system compared to a single-reader head. Similarly, there is a trend towards even high-track-density, narrower-track-width profiles. This requires narrower readers, which can be difficult to build with the desired performance. This increases the complexity involved in forming multiple readers on the same head/HGA.

One benefit of TDMR-ML is to eliminate the reader width constraint by reading more than one track at the same time using a wide reader. However, the TDMR-ML mapping algorithms may result in some capacity loss relative to a binary recording architecture. Also, wider readers not only pick multiple levels from integer multiples of tracks, but can also pick interference from adjacent tracks. This can complicate decoding the signals.

In this disclosure, a read architecture is proposed that addresses these issues by using an arrangement of multiple readers. Capacity and performance in such architectures do not only depend on reader width but increasingly on mechanical and electrical controls, which have more room for scalability than building narrower heads. For the sake of illustration, the following constraints are assumed for the example architectures described below: a maximum of two layers are used for building the read transducers; minimum edge-to-edge distance for readers on the same layer is 80-100 nm; write and read head physical transducers are limited with the maximum track density (which is inversely proportional to track pitch) considered for each example. It will be understood that these constraints/assumptions are provided for illustrative purposes. The constraints may be changed to achieve different architectures without deviating from scope of the claimed subject matter.

The diagram in FIG. 1 shows a reader arrangement according to an example embodiment which conforms to the constraints described above. The diagram shows three read transducers 102-104 (e.g., magnetoresistive stacks) as seen from an air-bearing surface (ABS) of one or more read heads. The read transducers 102-104 are commonly mounted on (e.g., integral to) the read heads. The read transducers 102-104 may be integrated into a single read head, or may be part of separate read heads commonly mounted on a single HGA. In the latter case, the HGA may include two or more heads/sliders, each including at least one of the read transducers. For example, as indicated by dashed line 112, co-planar readers 102, 103 may be provided on one read head, and centrally-located reader 104 may be provided on another read head. Other combinations may be possible, e.g., each reader on a separate head all mounted to a common HGA.

A pivot line 106 extends along a downtrack direction, with line 108 representing a crosstrack direction. The general steps behind the solution can be itemized as follows: The co-planar readers 102 and 103 are built on the same layer to reduce cost. The co-planar readers 102, 103 may be able to share a signal line, e.g., a shared shield that doubles as a signal line. In such a case, the readers 102, 103 can share a connecting pad on an outside of the one or more read heads. The edge-to-edge distance 110 for co-planar readers 102, 103 is larger than 80-100 nm. Generally, the tracks are written to the recording medium such that multiple tracks can lie between the co-planar readers 102, 103.

The centrally-located reader 104 is wide enough to cover multiple tracks between co-planar readers 102, 103, but narrow enough to pick up little interference, if any, beyond the tracks covered by co-planar readers 102, 103. Signals picked by the co-planar readers 102, 103 are used to recover information written at tracks adjacent to the centrally-located reader 104. From this recovered information, interference can be estimated and the effect of the interference mitigated on the signal picked by the centrally-located reader 104. The information stored in the multiple levels picked by the centrally-located reader 104 can then be recovered.

In this illustration, the three readers 102-104 will require up to six pads on the HGA. This can be reduced by sharing a pad between one of the co-planar readers 102, 103 and the centrally-located reader 104. For example, readers 102 and 104 could share a pad, or readers 103 and 104 could share a pad. The sharing of a pad could increase interference picked up between one of the co-planar readers 102, 103 and the centrally-located reader 104. The system could be designed accordingly to account for this interference. For example, track widths could be adjusted to pick less interference. Additionally or alternatively, an interference canceller can be designed with additional range to deal with the extra interference caused by sharing a pad.

In another example, the number of pads can be reduced by sharing a pad between the co-planar readers 102, 103. The co-planar readers 102, 103 may already be able to share co-planar magnetic shields, and so one of the shields can be configured as a common electrical interconnect. The sharing of a pad could increase interference picked up between the co-planar readers 102, 103. The system could be designed accordingly to account for this interference. For example, all the user information read by all three readers 102-104 could be jointly detected. In another embodiment, co-planar readers 102, 103 are used only to detect interference, and mitigate its effect on the centrally-located reader 104 to recover the information read by the centrally-located reader 104.

Figure 2:
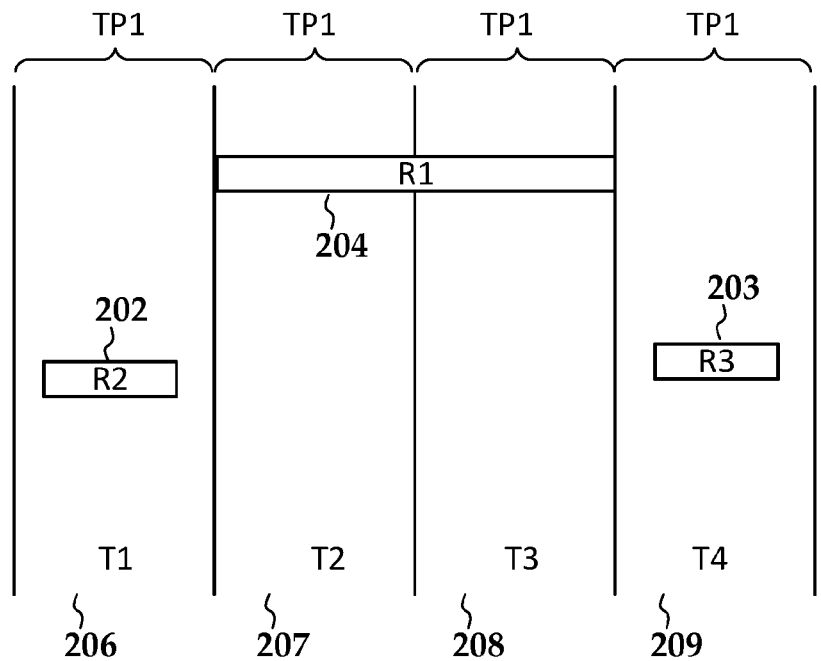
FIGS. 2-5 are block diagrams of reader and track architectures according to example embodiments.

In FIGS. 2-5, block diagrams illustrate recording media configurations for multi-reader architectures according to example embodiments. In FIG. 2, a diagram shows readers 202-204 arranged similarly to the readers 102-104 of FIG. 1. The readers 202-204 are shown located over tracks 206-209 of a recording medium, all having substantially equal track pitch/width (TP1). The tracks 206-209 can be written using any write technology, such as perpendicular, HAMR, shingled, etc.

The co-planar readers 202, 203 are configured to read single tracks 206 and 209. For a 64 nm track width, the edge-to-edge distance between co-planar readers 202, 203 becomes 154 nm, assuming reader width is equal to 60% of track width. The offset, central reader 204 spans both tracks 207 and 208. As such, the data on tracks 207 and 208 depend on each other and so the control may utilize a caching arrangement (e.g., similar to that used in SMR) to store the data to be written on a second one of the tracks 207, 208 while a first one of the tracks 207, 208 is currently being written to.

A controller for the arrangement shown in FIG. 2 may synchronize the bits written on the tracks 207, 208 such that corresponding bits in the tracks 207, 208 are aligned in a cross-track direction. In such a case, the reader 204 reads a multi-level signal, which includes the adjacent track bit combinations (0,0), (1,0)/(0,1), and (1,1). The data can be mapped to these multi-level signals in a number of ways. For example, four-bit input into the tracks 207, 208 with a three-bit output results in a ¾=0.75 mapping rate, and the net mapping rate for all 4 tracks becomes 3.5/4=0.875. A 14-bit input into the tracks 207, 208 with an 11-bit output yields an $^{11}/_{14}$=0.7857 mapping rate. The theoretically highest mapping rate for tracks 207, 208 is Log 2(3)/2=1.585/2=0.7925. Generally, an arrangement as shown in FIG. 2 can yield AD=0.875 of the conventional AD, assuming a 0.75 mapping rate for tracks 207, 208. The sequential performance is 3.5 times that of a conventional single reader head/HGA.

Figure 3:
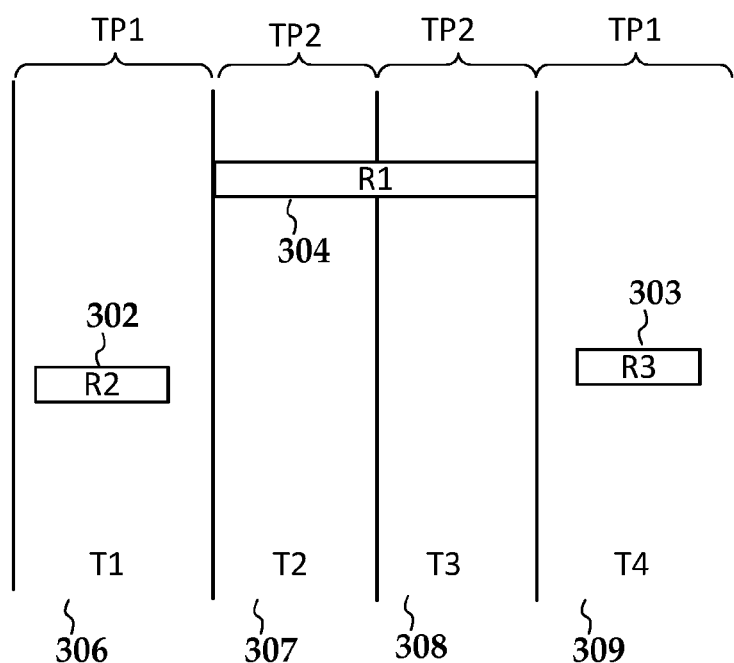

In FIG. 3, readers 302-304 are arranged similarly to the readers 102-104 of FIG. 1. The readers 302-304 are shown located over tracks 306-309. Outer tracks 306, 309 have a relatively larger width/pitch (TP1) compared to that (TP2) of the inner tracks 307, 308. The tracks 306-309 can be written at the different widths using shingled writing, varying HAMR hotspot width, head with multiple writers of different widths, etc. An example of the latter includes a head configured for interlaced magnetic recording (IMR). An IMR device writes tracks having alternately wider and narrower widths. The tracks are written non-sequentially, e.g., tracks of a first width are written at a double track pitch, and then interleaved tracks of a second width are written between the first tracks at the double pitch. These different widths can be obtained by using different-width writers or by other means (e.g., adjusting HAMR laser power where a HAMR writer is used).

The arrangement shown in FIG. 3 can be read from and written to similarly to the arrangement in FIG. 2; e.g., three signal level reading of inner tracks 307, 308, buffered/cached writing of inner tracks 307, 308, adjacent track bit synchronization of inner tracks 307, 308, etc. By using the narrower width TP2 for the inner tracks 307, 308, the edge-to-edge distance between co-planar readers 302, 303 is reduced. For example, if TP1 is set to 64 nm and TP2 is set 40 nm, the edge-to-edge distance between readers 302, 303 becomes 106 nm. In such a case, the overall AD=0.875*(64/64+64/40+64/40+64/64)/4=1.1375 of the AD of one conventional reader using a 64 nm track width. The sequential read performance is 3.5 times that of a conventional single-reader head/HGA.

In the example of FIG. 3, AD was increased but there is still a loss due to mapping efficiency in the inner tracks. In reference now to FIG. 4, a diagram shows readers 402-404 are arranged similarly to the readers 102-104 of FIG. 1. The readers 402-404 are shown located over tracks 406-409. Outer tracks 406, 409 and inner track 408 have a relatively larger width/pitch (TP1) compared to that (TP2) of the inner track 407. In this case, the larger width TP1 is double the narrower width TP2.

Figure 4:
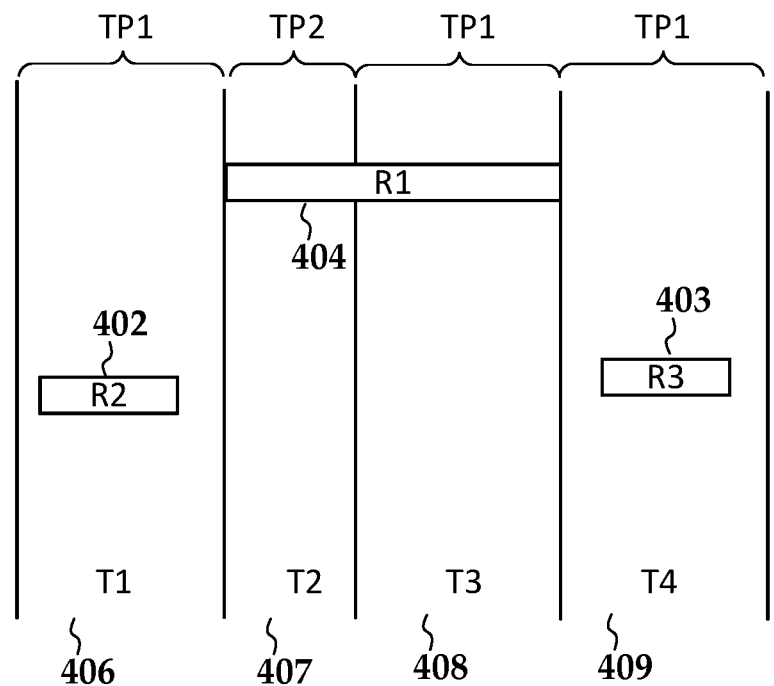

In most aspects, the arrangement shown in FIG. 4 can be read from and written to similarly to the arrangement in FIG. 2; e.g., multi-level reading of inner tracks 407, 408, buffered/cached writing of inner tracks 407, 408, adjacent track bit synchronization of inner tracks 407, 408, etc. The combination of a narrower inner track 407 and wider inner track 408 can improve mapping efficiency over the configuration shown in FIG. 3 (e.g., results in four levels instead of three levels). The write process can form tracks as shown in FIG. 4 using shingled recording, e.g., with inner tracks 407, 403 forming a band of two tracks. Alternatively, an IMR scheme can be used. For example, track 407 can be written initially wide, and then trimmed on one or both sides by adjacent tracks 406 and 408. As with other examples, the tracks 306-309 can be also/instead written at the different widths by varying HAMR hotspot width, using a head with multiple writers of different widths, etc.

In the example shown in FIG. 4, keeping TP1 equal to 64 nm and TP2 to 32 nm, the edge-to-edge distance between readers 403, 403 becomes 112 nm. This results in areal density AD=(64/64+64/32+64/64+64/64)/4=1.25 of the AD of a one-reader head using a 64 nm track width. Sequential performance is four times that of the conventional single-reader head. The AD of the system in FIG. 4 is improved due to the improved mapping rate of TDMR-ML recording on inner tracks 407, 408 by creating four levels instead of three levels in previous example architectures. The AD can be further improved by adding more narrow tracks to the outside, as shown in the example embodiment of FIG. 5.

Figure 5:
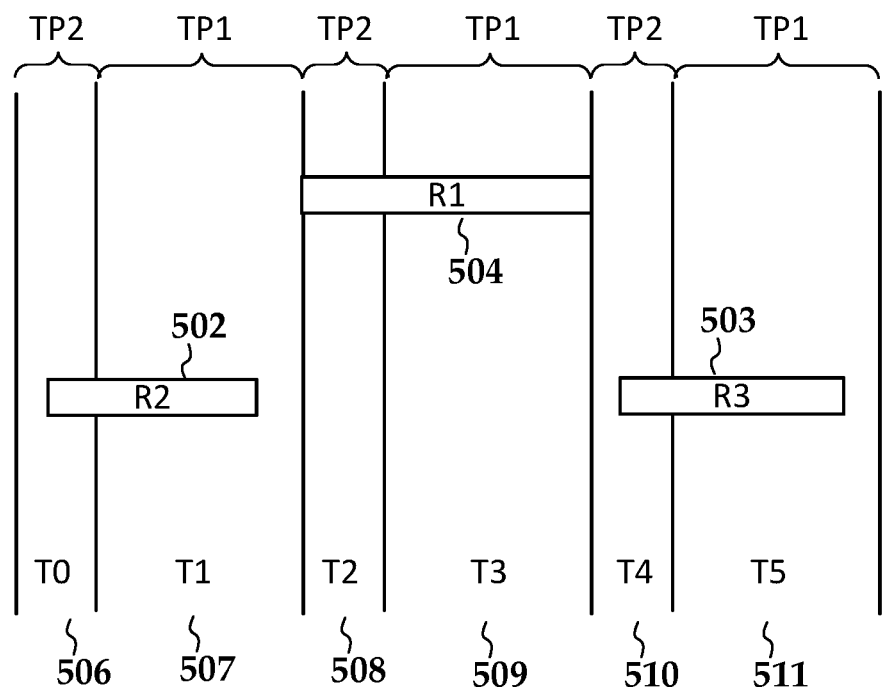

In FIG. 5, readers 502-504 are arranged similarly to the readers 102-104 of FIG. 1. The readers 502-504 are shown located over tracks 506-511. Alternate tracks 507, 509, 511 have a relatively larger width/pitch (TP1) compared to interleaved tracks 506, 508, 510. The arrangement shown in FIG. 5 can be read from and written to similarly to the arrangement in FIG. 5; e.g., multi-level reading of inner tracks 508, 509, buffered/cached writing of inner tracks 508, 509, adjacent track bit synchronization of inner tracks 508, 509, etc. In this case, the multi-level signal reading, bit synchronization, and buffering/caching would also be applied to outer track pairs 506, 507 and 510, 511.

The tracks 506-511 can be written via shingled recording, with one narrow track 506, 508, 510 and one respective adjacent wide track 507, 509, 511 forming a band of two tracks. The tracks 506-511 also be written using IMR recording, e.g., writing tracks 506, 508, 510 first using a wide writer then, trimming tracks 506, 508, 510 both sides by wide tracks 507, 509, 511. As with other examples, the tracks 506-511 can also/instead be written at the different widths by varying HAMR hotspot width, using a head with multiple writers of different widths, etc.

In the example of FIG. 5, keeping the larger width TP1 equal to 64 nm and setting narrow width TP2 to 32 nm, the edge-to-edge distance between readers 502, 503 becomes 134 nm. The overall AD=(64/64+64/32+64/64+64/32)/4=1.5 of the AD of a one-reader head using a 64 nm track width. The sequential read performance is six times that of a conventional single-reader head/HGA.

Figure 6:
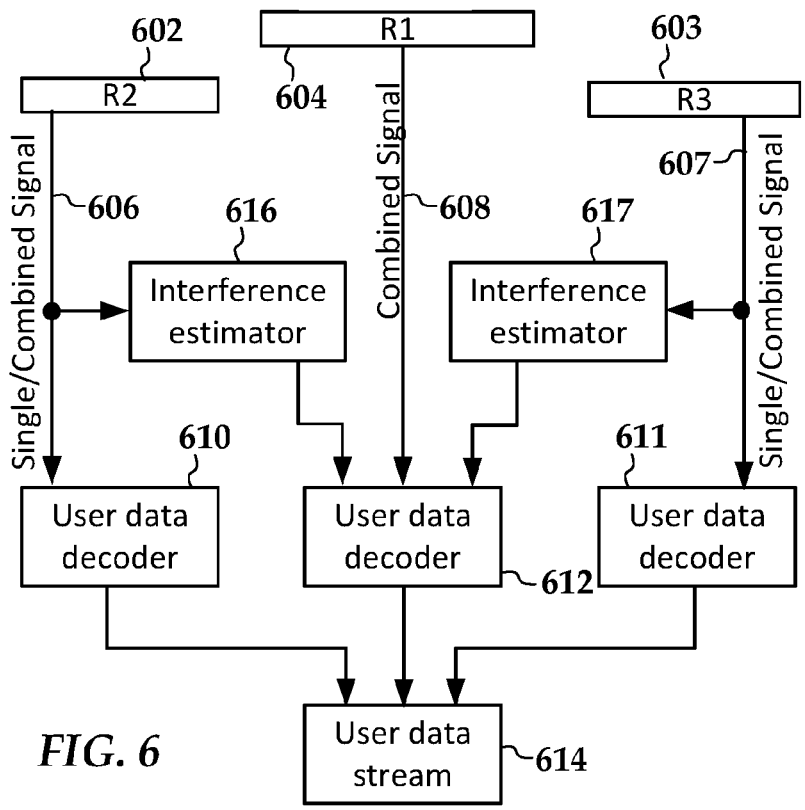
FIGS. 6 and 7 are block diagrams of processing modules according to example embodiments.
Figure 7:
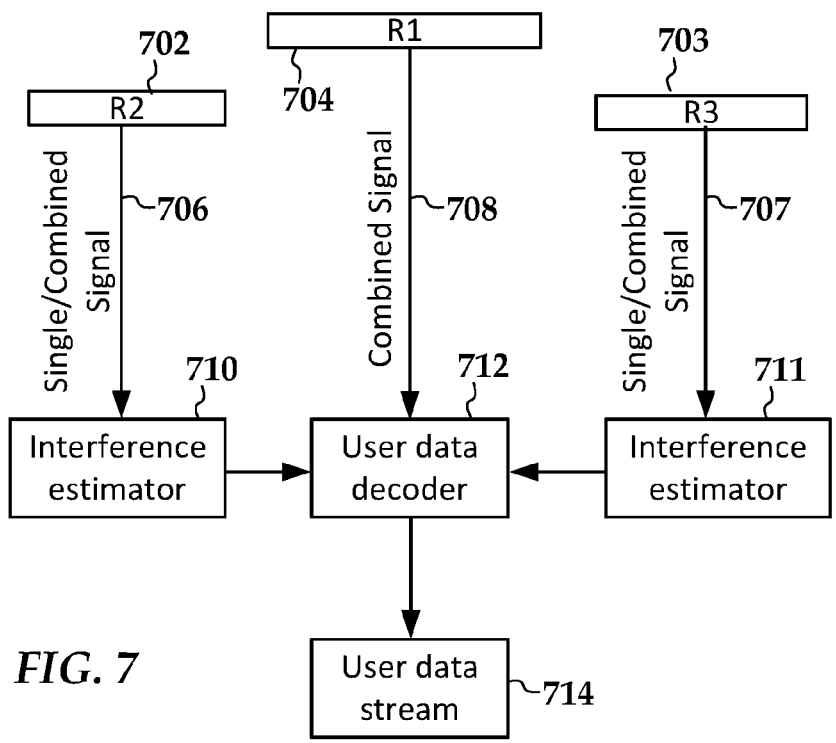

As noted above the outer tracks read by co-planar readers can be used as either parallel user data sources or as sources for interference cancellation. In FIGS. 6 and 7, block diagrams illustrated component diagrams in both of these example configurations. In FIG. 6, readers 602-604 are arranged similarly within a read head similar to the readers 102-104 of FIG. 1. The readers 602-604 provide respective signals 606-608 to decoding modules 610-612. Note that the signal 608 from central reader 604 is a combined signal due the reader 604 encompassing multiple tracks. Signals 606, 607 from readers 602, 603 may be either single/binary signals (e.g., from configurations seen in FIGS. 2-4) or combined multi-level signals (e.g., from configuration seen in FIG. 5). As indicated by interference estimator blocks 616, 617, the signals 606, 607 may be used by decoder 612 to cancel inter-track interference from signal 608. Similar cancellation of interference originating from signal 608 may be provided for signals 606, 607 via additional estimator modules (not shown).

The decoding modules 610-612 simultaneously process the signals 606-608 to produce a user data stream 614. The modules 610-612 may process other data, e.g., servo data, in the same or different manner. Note that the function of modules 610-612 may be combined into a single decoder, e.g., a multiple-input, single-output (MISO) decoder. Due to the downtrack offset between the co-planar readers 602, 603 and the central reader 604, the modules 610-612 may perform time correction on the signals 606-608 before decoding. Such correction may also be used between co-planar readers 602, 603, e.g., when at high skew angles relative to the tracks being read.

In FIG. 7, readers 702-704 are arranged similarly within a read head similar to the readers 102-104 of FIG. 1. The central reader 704 provides a combined signal 708 to a decoding module 712 due the reader 704, the signal 708 being combined due to reader 704 encompassing multiple tracks. Co-planar readers 702, 703 provide respective signals 706, 707 to interference estimator modules 710, 711. The signals 706, 707 from readers 702, 703 may be either single/binary signals (e.g., from configurations seen in FIGS. 2-4) or combined multi-level signals (e.g., from configuration seen in FIG. 5).

The decoding module 712 processes the signals to produce a user data stream 714 using outputs from the estimators 710, 711 to cancel inter-track interference. The modules 710-712 may process other data, e.g., servo data, in the same or different manner. Due to the downtrack offset between the co-planar readers 702, 703 and the central reader 704, the modules 710-712 may perform time correction on the signals 706-708 before estimation/decoding. Such correction may also be used between co-planar readers 702, 703, e.g., when at high skew angles relative to the tracks being read.

In all the example architectures above, TDMR-ML recording was demonstrated assuming inner tracks either having equal track widths or one width twice as large than the other one. In general, the tracks can have any width, and mapping rate and systems performance can be defined for multi-level recording in such a system. In the example architectures above, the co-planar readers were assumed to be used for recovering user data to help maximize sequential read performance for each case. However, instead of recovering the user data, one or more co-planar readers can be used to extract inter-track interference and mitigate its effect on the central readers. This leads to lower power consumption, since high sequential data rates do not need to be supported.

Using the co-planar readers for interference cancelling can also lead to simpler read-channel architectures. Such a configuration may also allow successfully reading data at higher bit error rate (BER) levels. In such a case, other system design parameter relaxations (like the sensitivities of the co-planar readers) might be relaxed, allowing other design features, such as the sharing of pads between co-planar readers. Areal density can also be increased by squeezing tracks addressed by the co-planar readers.

Figure 8:
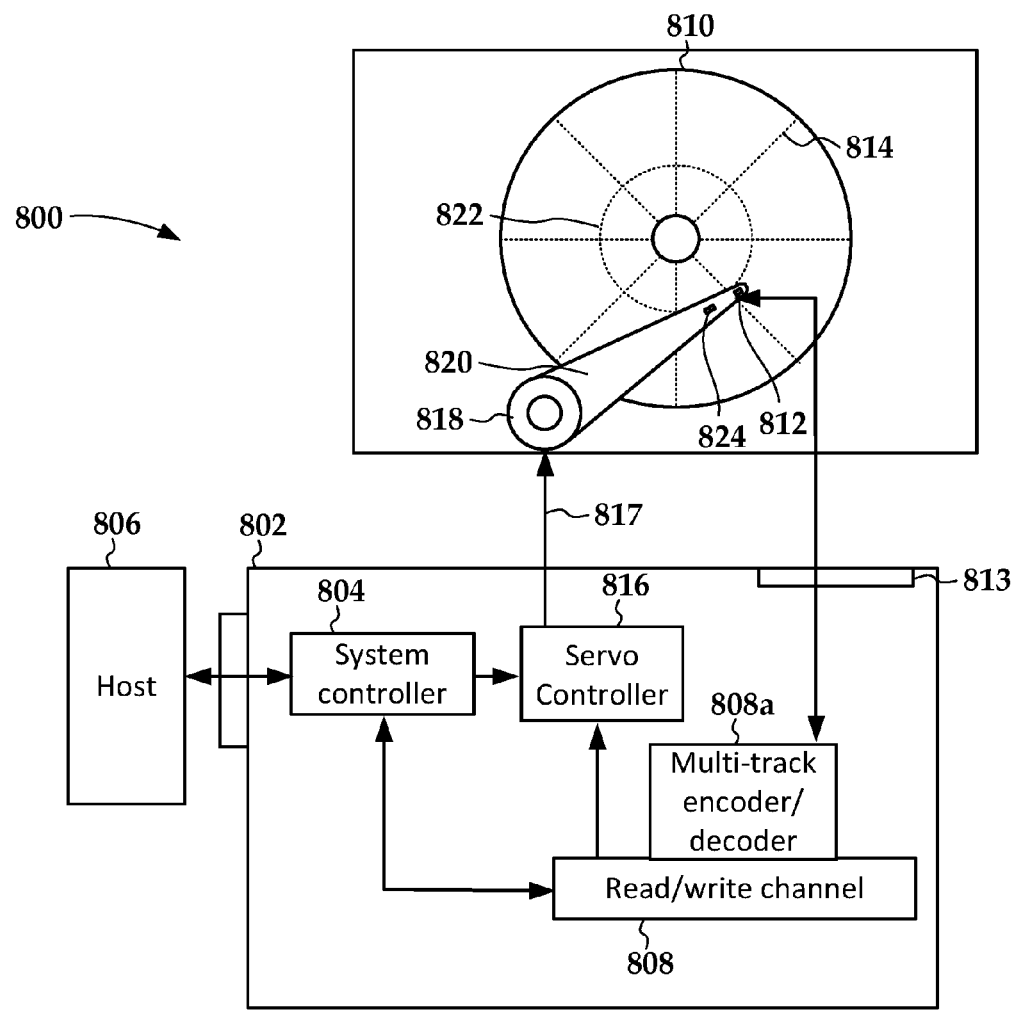
FIG. 8 is a block diagram of an apparatus according to an example embodiment.

In FIG. 8, a diagram illustrates components of a hard drive apparatus 800 that utilizes one or more read/write heads 812 according to example embodiments. The apparatus includes circuitry 802 such as a system controller 804 that processes read and write commands and associated data from a host device 806. The host device 806 may include any electronic device that can be communicatively coupled to store and retrieve data from a data storage device, e.g., a computer. The system controller 804 is coupled to a read/write channel 808 that reads from and writes to surfaces of one or more magnetic disks 810.

The read/write channel 808 generally converts data between the digital signals processed by the system controller 804 and the analog signals conducted through two or more read/write heads 812 during read operations. At least one of the read/write heads 812 includes a first reader that encompasses multiple inner tracks of the disk 810 and second and third co-planar readers that read from first and second outer tracks that surround the inner tracks. The central, first reader obtains a combination signal from the inner tracks, and the second and third co-planar readers may read a single or combined signal from the outer tracks.

The read/write channel 808 may include analog and digital circuitry such as decoders, timing-correction units, error correction units, etc. The read/write channel is coupled to the heads via interface circuitry 813 that may include preamplifiers, filters, digital-to-analog converters, analog-to-digital converters, etc. As shown in the figure, the read/write channel 808 utilizes a multi-track encoder/decoder 808*a* that facilitates reading from and writing to the disk using at least one of the arrangements shown in FIGS. 2-5. The encoder/decoder 808*a* may be configured to recover user data from first through third readers simultaneously and/or recover user data from the first reader while using signals from the second and third co-planar readers to reject adjacent track interference, e.g., as shown in FIGS. 6 and 7.

The read/write channel 808 may facilitate buffering/caching data during writes to facilitate shingled and/or IMR writing. If the read/write head 812 includes multiple writers, the read/write channel 808 may send write data to multiple writers or to a selected subset of the writers during certain phases of write operations. The read/write channel 808 may be configured to read and write data differently for different zones of disk 810. For example, some zones may use a combination of narrow and wide tracks as shown in FIGS. 3-5, where other zones use the same size tracks as shown in FIG. 2.

In addition to processing user data, the read/write channel 808 reads servo data from servo wedges 814 on the magnetic disk 810 via the read/write head. All of the multiple readers of the read/write head may be used to read servo data, or only a subset thereof. The servo data are sent to a servo controller 816, which uses the data to provide position control signals 817 to a VCM 818. The VCM 818 rotates an arm 820 upon which the read/write heads 812 are mounted in response to the control signals 817. The position control signals 817 may also be sent to microactuators 824 that individually control each of the read/write heads 812, e.g., causing small displacements at each head.

Figure 9:
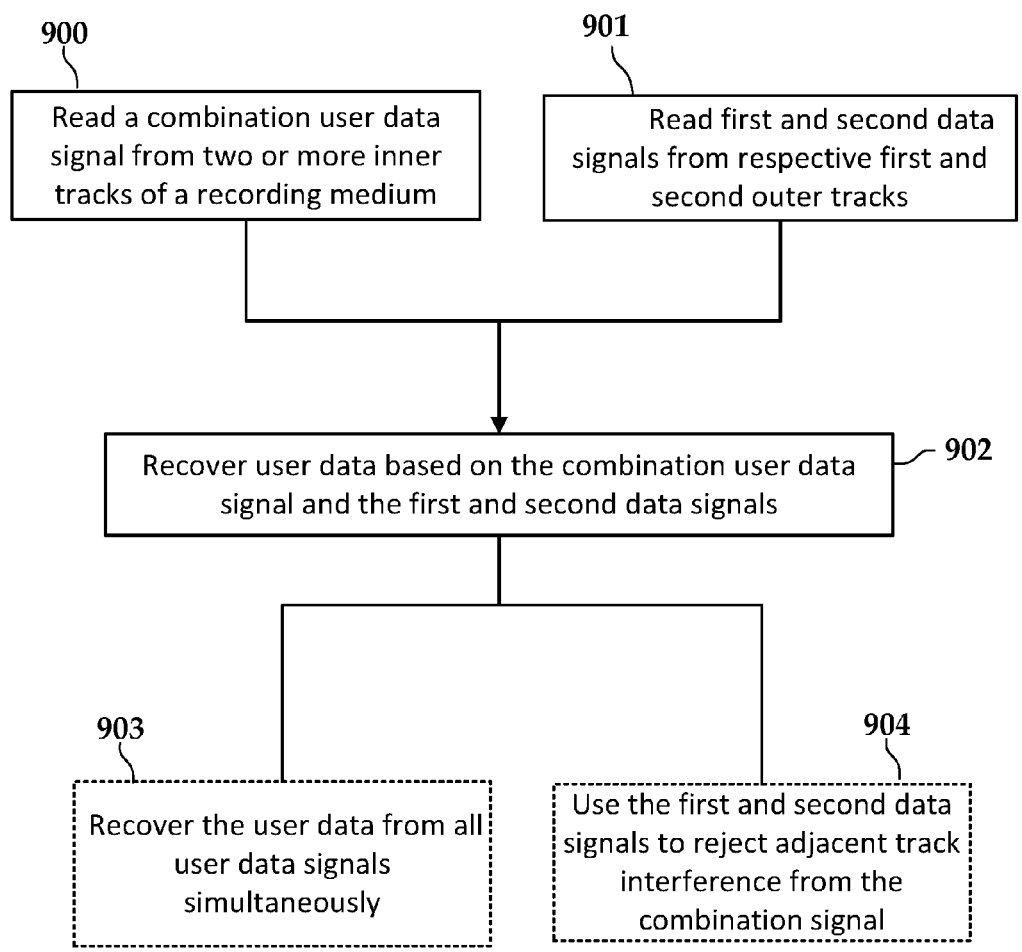
FIG. 9 is a flowchart showing a method according to an example embodiment.

In reference now to FIG. 9, a flowchart illustrates a method according to an example embodiment. The method involves reading 900 a combination user data signal from two or more inner tracks of a recording medium via a first reader that encompasses the inner tracks. Second and third co-planar readers that are on a same read head as the first reader will also read 901 first and second data signals from respective first and second outer tracks that surround the inner tracks. The first reader is centered between and downtrack from the first and second co-planar readers on the read head. User data is recovered 902 based on the combination user data signal and the first and second data signals.

The first and second data signals may include (or be treated as) first and second user data signals, in which case the recovery 902 of data may involve simultaneously recovering the user data from the combination user data signal, the first user data signal, and the second user data signals as indicated by block 903. In other cases, the first and second data signals may not be treated as user data (e.g., no attempt made to recover user data from the signals), but are instead used just for interference rejection. In such a case, the recovery 902 involves using 904 the first and second data signals to reject adjacent track interference from the combination signal. The interference originates from the first and second outer tracks.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   reading a combination user data signal from two or more inner tracks of a recording medium via a first reader that encompasses the inner tracks;
   reading, via second and third co-planar readers that are on a same head-gimbal assembly as the first reader, first and second data signals from respective first and second outer tracks that surround the inner tracks, the first reader being centered between and downtrack from the first and second co-planar readers on the same head-gimbal assembly; and
   recovering user data based on the combination user data signal and the first and second data signals.

2. The method of claim 1, wherein the first and second data signals comprise first and second user data signals, and wherein recovering the user data comprises recovering the user data from the combination user data signal, the first user data signal, and the second user data signal simultaneously.

3. The method of claim 1, wherein recovering the user data comprises recovering the user data from the combination user data signal and using the first and second data signals to reject adjacent track interference from the combination user data signal, the adjacent track interference originating from the first and second outer tracks.

4. The method of claim 1, wherein the inner tracks and the outer tracks have the same width.

5. The method of claim 1, wherein at least one of the inner tracks have a first width that is less than a second width of the outer tracks.

6. The method of claim 5, wherein both of the inner tracks have the first width.

7. The method of claim 5, wherein one of the inner tracks has the first width and another of the inner tracks have the second width, wherein the second width is twice that of the first width.

8. The method of claim 1, wherein the first and second data signals comprise combination data signals read from third and fourth outer tracks that surround the respective first and second outer tracks.

9. The method of claim 8, wherein the first through fourth outer tracks and the inner tracks are arranged as narrow tracks interleaved between wider tracks.

10. The method of claim 1, wherein the combination user data signal comprises a multi-level signal based on binary combinations of the inner tracks.

11. The method of claim 1, wherein bits of the inner tracks are aligned in a cross-track direction.

12. An apparatus comprising:
    interface circuitry receiving signals from a first, second, and third readers commonly mounted on a head-gimbal assembly, the first reader located between the second and third readers in a crosstrack direction and encompassing two or more inner tracks of a recording medium, the second and third readers being co-planar and offset from the first reader in a downtrack direction, the second and third reader each encompassing first and second outer tracks that surround the inner tracks;
    a controller coupled to the interface circuitry and configured to:
      receive a combination user data signal of the inner tracks from the first reader;
      receive first and second data signals of the first and second outer tracks from the second and third readers; and
      recover user data based on the combination user data signal and the first and second data signals.

13. The apparatus of claim 12, wherein the first and second data signals comprise first and second user data signals, and wherein recovering the user data comprises recovering the user data from both the combination user data signal and the first and second user data signals simultaneously.

14. The apparatus of claim 12, wherein recovering the user data comprises recovering the user data from the combination user data signal and using the first and second data signals to reject adjacent track interference from the combination user data signal, the adjacent track interference originating from the first and second outer tracks.

15. An apparatus comprising:
    a head-gimbal assembly comprising first, second, and third readers, the first reader located between the second and third readers in a crosstrack direction, the second and third readers being co-planar and offset from the first reader in a downtrack direction; and
    a controller coupled to the head and configured to:
      receive a combination user data signal from the first reader, the combination user data signal read from two or more inner tracks of a recording medium encompassed by the first reader;
      receive first and second data signals from the second and third readers, the first and second data signals read from respective first and second outer tracks that surround the inner tracks;
      recover user data based on the combination user data signal and the first and second data signals.

16. The apparatus of claim 15, wherein the first and second data signals comprise first and second user data signals, and wherein recovering the user data comprises recovering the user data from both the combination user data signal and the first and second user data signals simultaneously.

17. The apparatus of claim 15, wherein recovering the user data comprises recovering the user data from the combination user data signal and using the first and second data signals to reject adjacent track interference from the combination user data signal, the adjacent track interference originating from the first and second outer tracks.

18. The apparatus of claim 15, wherein the head gimbal assembly comprise two or more read heads each comprising at least one of the first, second, and third readers.

19. The apparatus of claim 15, wherein the second and third readers share a common signal line.

20. The apparatus of claim 15, wherein a cross-track separation distance between the second and third readers is larger than 80 nm.

\* \* \* \* \*